March 10, 1970   C. J. MILAZZO   3,499,524
ACCUMULATING TRANSFER CONVEYOR
Filed April 24, 1968   4 Sheets-Sheet 1
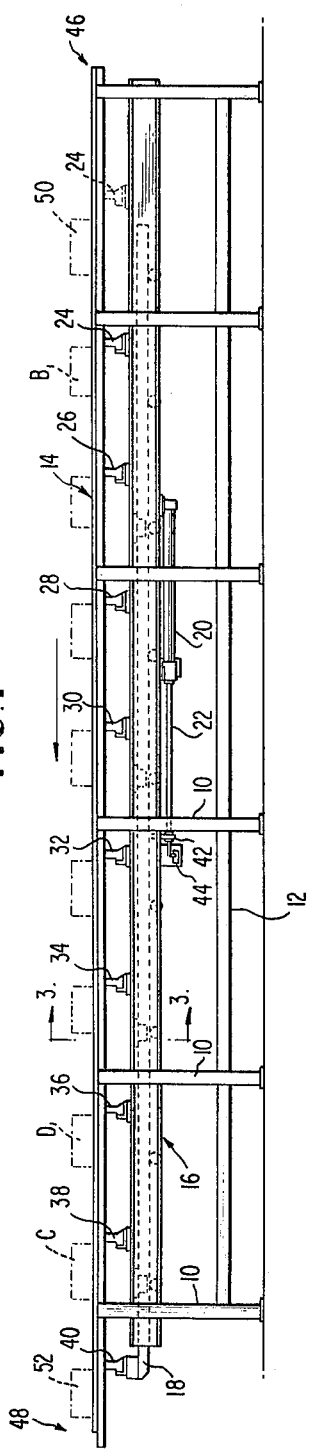
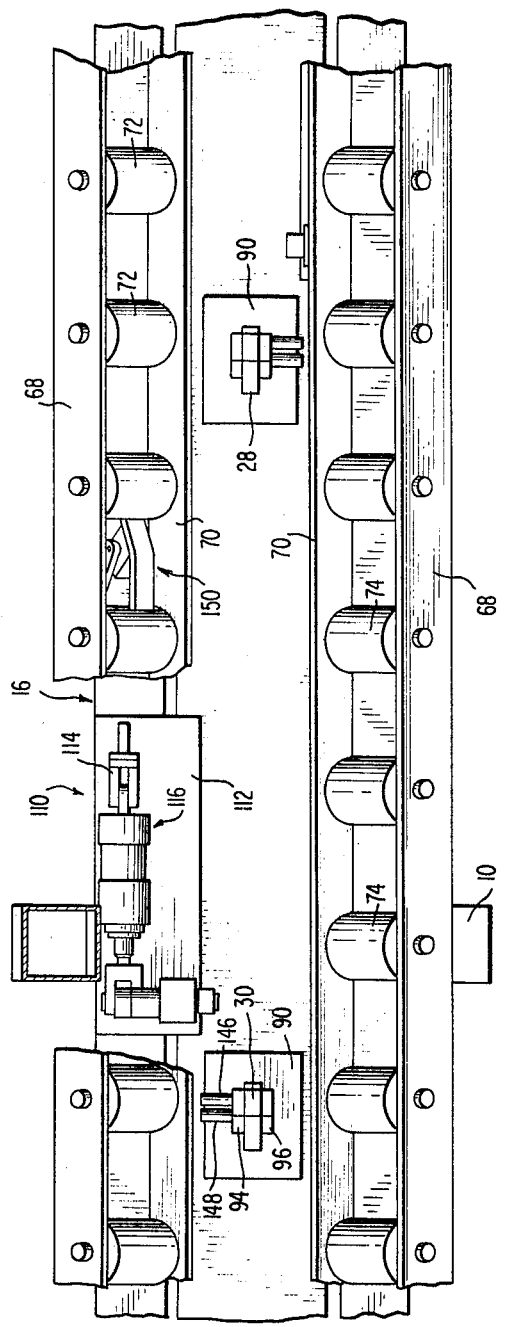
INVENTOR.
CARL J. MILAZZO
BY
Christel & Bean
ATTORNEYS March 10, 1970  C. J. MILAZZO  3,499,524
ACCUMULATING TRANSFER CONVEYOR Filed April 24, 1968  4 Sheets-Sheet 2

INVENTOR.
CARL J. MILAZZO
BY
Christel & Bean
ATTORNEYS

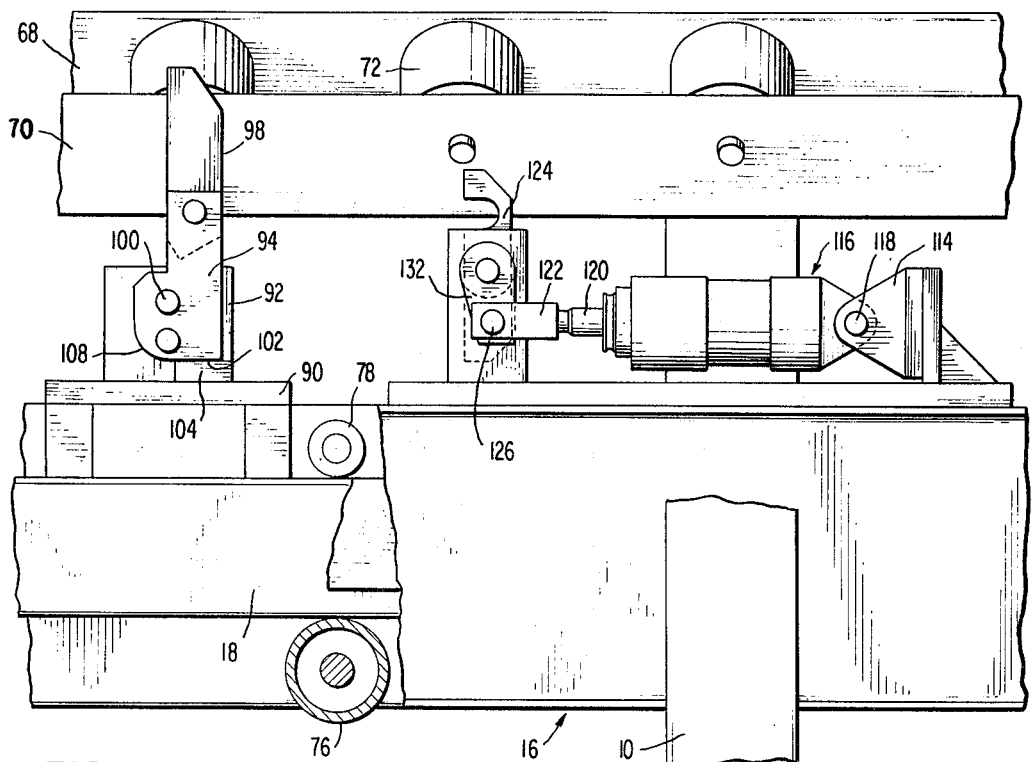
FIG.6
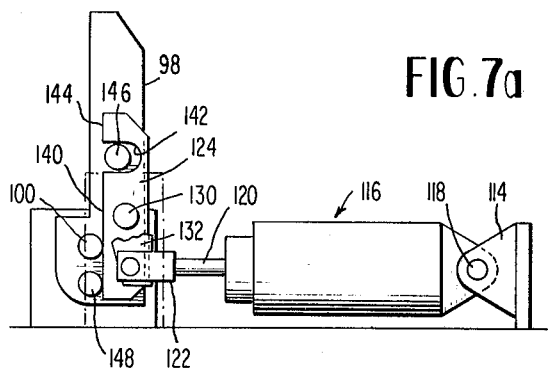
FIG.7a
FIG.7b
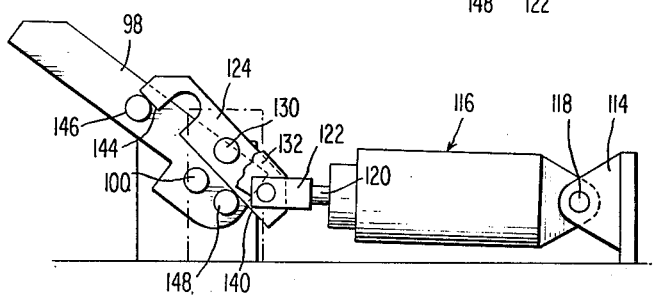
INVENTOR.
CARL J. MILAZZO
BY Christel & Bean
ATTORNEYS INVENTOR.
CARL J. MILAZZO
BY Christel & Bean
ATTORNEYS United States Patent Office 3,499,524
Patented Mar. 10, 1970

3,499,524
ACCUMULATING TRANSFER CONVEYOR
Carl J. Milazzo, Tonawanda, N.Y., assignor to Hohl Machine and Conveyor Co., Inc., Buffalo, N.Y.
Filed Apr. 24, 1968, Ser. No. 723,756
Int. Cl. B65g 25/08, 47/26
U.S. Cl. 198—221                                4 Claims

ABSTRACT OF THE DISCLOSURE

The pusher dogs on the carrier of an accumulating transfer conveyor are movable between operative and disabled positions and each is selectively moved to one of these positions by an associated cam mechanism. The cam mechanisms are fixed in position to be engaged by the pusher dogs as the carrier reaches the end of its return stroke so that as the carrier starts its working stroke, the pusher dogs move out of engagement with their cam mechanisms thus greatly simplifying the mechanism involved, avoiding any tendency for the pusher dogs to be operated during the working stroke, and allowing the cam mechanisms to be operated by a simple yet effective fluid pressure differential system.

BACKGROUND OF THE INVENTION

My prior Patents 3,355,008 and 3,322,259 are directed to accumulating transfer conveyors wherein the presence of an article at the last article position in the series of successive article positions automatically prevents advancement of all preceding articles unless there is an unfilled article position, in which case only those articles between the blocked and unfilled positions are prevented from advancing while all articles preceding the unfilled position are allowed to advance.

In my prior Patent 3,322,259 in particular, wherein pusher dogs are mounted on a common carriage and may be moved between operative and disabled positions for the purpose of effecting or preventing article advancement, the mechanisms for moving the pusher dogs between the aforesaid operative and disabled positions are mounted on the carriage and thus reciprocate back and forth with it and, furthermore, the mechanisms are in position to exercise control over the pusher dogs at any time. Consequently, since the actuators for the pusher dogs are air operated, flexible lines are required to allow for the reciprocatory motion of the carriage and, as well, the control mechanisms may exert actuating forces on the pusher dogs even while the carriage is on its working stroke and the dogs are in engagement with their respective articles.

BRIEF SUMMARY OF THE INVENTION

The present invention relates to an accumulating transfer conveyor utilizing a carriage and a series of pusher dogs pivotally mounted thereon for disposition between operative and disabled positions with the provision of indexing or camming means for the dogs which are stationary with respect to the carriage so as to engage and influence the position of the dogs only when the carriage is returned in preparation for its next working stroke, the pusher dogs being moved away from and free from influence by the camming means during the working stroke of the carriage. In this fashion, the actuating and control mechanism associated with the indexing or camming means is greatly simplified. Further, the invention encompasses a valve control system for controlling the indexing means by differential fluid pressure wherein a low pressure line normally urges the indexing or camming elements to a position causing the pusher dogs to assume operative positions and wherein a higher pressure line is controlled through a valve system to actuate the mechanisms by differential pressure to move the indexing elements to a position wherein the pusher dogs are disposed in disabled positions.

BRIEF DESCRIPTION OF THE FIGURES OF THE DRAWING

FIG. 1 is a side elevational view of an accumulating conveyor constructed according to the present invention;

FIG. 2 is an enlarged plan view of a portion of the accumulating conveyor shown in FIG. 1;

FIG. 6 is a vertical longitudinal section showing further the relationship between the pusher dogs and the indexing members;

FIG. 7a is a diagrammatic view illustrating the disposition of the indexing mechanism to establish the operative position of the associated pusher dog and FIG. 7b is a similar view but showing the pusher dog urged to disabled position;

DETAILED DESCRIPTION OF THE INVENTION

Figure 3:
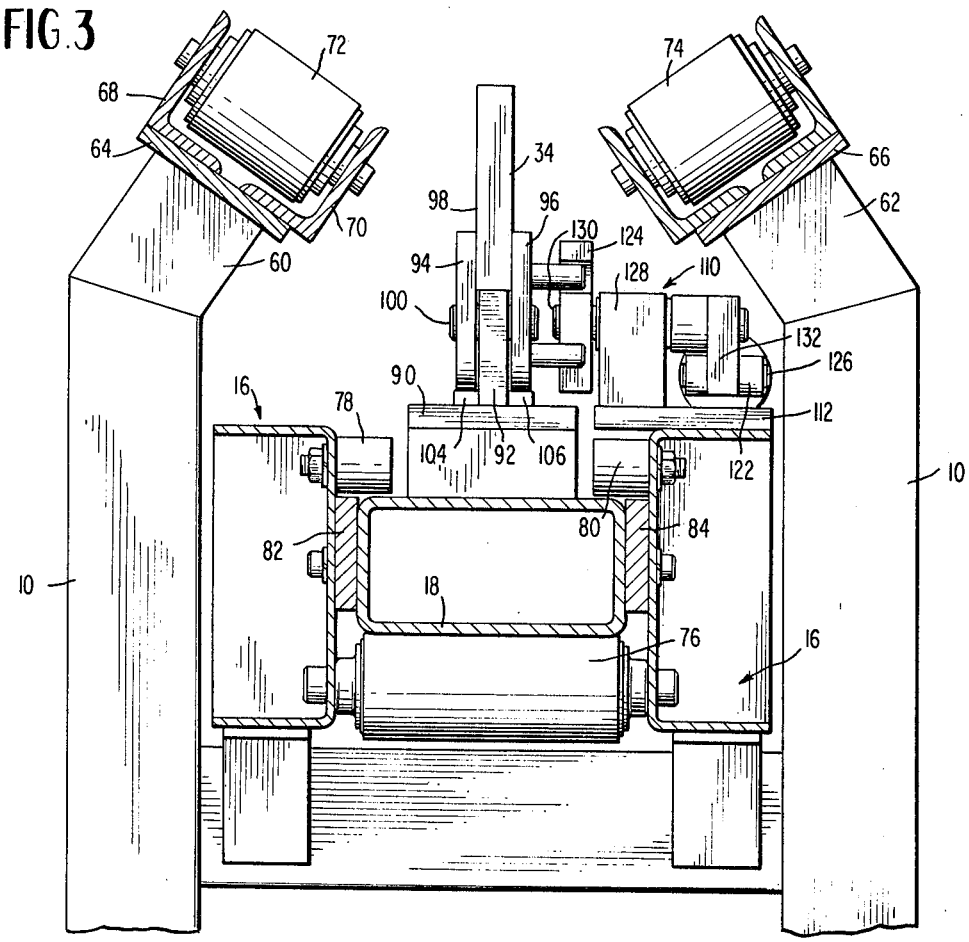
FIG. 3 is an enlarged transverse section taken along the plane of section line 3—3 in FIG. 1 and illustrating the relative disposition between the pusher dogs and their indexing means.

With reference now to FIG. 1, the accumulating transfer conveyor shown therein includes a frame having uprights 10 and suitable rigidifying or bracing elements 12 and defining on its upper side a supporting portion 14 along which articles are conveyed in step-by-step fashion as will hereinafter appear. Disposed below the supporting portion 14 is a framework 16 which supports an elongate carriage, one end of which may be seen at 18 in FIG. 1 and suitable means such as the hydraulic cylinder 20 and associated piston rod 22 may be provided to impart reciprocatory motion to the carriage 18.

A series of pusher dogs 24, 26, 28, 30, 32, 34, 36, 38 and 40 are mounted in longitudinally spaced relationship along the length of the carriage 18 and move back and forth with the carriage. In the position of the parts shown in FIG. 1, the piston rod 22 through its connection 42 with the carriage 18 and in conjunction with a limit switch 44 has just completed its working stroke and will next cycle through the return stroke (which may be terminated by a further limit switch not shown) to once again reverse the direction and impart a working stroke to the carriage 18. This motion is cyclic or continuous, the carriage successively progressing through its working and return strokes and carrying the pusher dogs with it in the process.

The input end of the conveyor assembly is indicated generally by the reference character 46 and the output end is indicated generally by the reference character 48. Insofar as the present invention is concerned, it is immaterial as to the mechanism involved in placing articles at the input position as indicated by the article 50 in FIG. 1 or the mechanism by which the articles are removed at the output end. Suffice it to say that both the input and output of the transfer conveyor may be random so that at times the article 52 at the discharge position will not be removed and similarly that an article 50 will not be placed in the input position. An article placed in the input position 50 will be moved in step-by-step fashion through a series of positions on the article supporting portion until it reaches the position of the article 52 whereafter it is removed and ideally the condition of the conveyor is to have an article present in all of its various positions so that it is continually capable of conveying an article to the discharge position. However, due to the aforesaid random nature of input and output, the ideal condition may not always prevail. At times, all of the article positions will be filled whereas at other times one or more gaps may be present in the series of article positions. In the former case, should the article 52 not be removed by the time of the next working stroke of the carriage 18, all of the pusher dogs should be disabled. In the latter case, all of the pusher dogs between the last position (article 52) and the first gap should be disabled while all of the remaining pusher dogs should be disposed in operative positions.

The working stroke of the machine is somewhat greater than the spacing between adjacent pusher dogs so that when the pusher dogs are in their return positions, they will lie somewhat behind (or to the right in FIG. 1) of the articles disposed at the various article positions of the conveyor mechanism. In the event that the article 52 at the discharge position is not removed, and all of the intermediate positions are filled with articles, it is necessary to disable all of the pusher dogs so that none moves an article. If, on the other hand the article 52 has not been removed but that there is a gap or gaps at one or more of the article positions it is required that all pusher dogs starting from the pusher dog 40 and working back to the gap be disabled and that all of the remaining pusher dogs be operative with the idea of advancing all articles upstream of the gap or gaps.

If, however, the end article 52 is removed, it is required that all of the pusher dogs remain in operative position to advance all of the articles that may be on the conveyor. The above general relationship is described in my prior Patent 3,322,259 and it is within the framework of this general concept that the improvement constituting the present invention resides.

Referring to FIGS. 2 and 3, it will be seen that the conveyor frame includes inwardly inclined upper portion 60 and 62 formed as extensions of the uprights 10 which mount the bearing plates 64 and 66 for supporting the opposed angle members 68 and 70 between which are journalled the series of rollers 72 and 74. The rollers actually support the articles being moved along the conveyor mechanism, as will be obvious. The framework 16 may take any convenient form and serves to mount lower rollers 76 which form a bed for the carriage 18 which, in the particular instance shown, may take the form of a beam of hollow rectangular section. Upper guide rollers 78 and 80 are provided to aid in guiding the carriage 18 and side plates 82 and 84 may be provided to minimize lateral movement of the carriage.

The pusher dogs are mounted on base members 90 fixed to the upper surface of the carriage 18 and an upstanding ear 92 on each base 90 is straddled by a pair of leg members 94 and 96 fixed to and depending from the main body 98 of each pusher dog, a pivot pin 100 extending through the legs 94 and 96 and the ear 92 to allow for pivotal motion of each pusher dog between an upstanding operative position and a forwardly inclined disabled position, such positions being shown respectively in FIGS. 7a and 7b. The pusher dogs are constructed to remain in whichever of these positions they may be disposed until moved otherwise. To assure proper reaction force when the dogs are moving articles, each leg 94 and 96 is provided at its lower end with a heel portion 102 engaging the blocks 104 and 106 respectively as may be seen best in FIGS. 3 and 6. The forward corners of ence character 108 to clear the blocks 104 and 106 and the legs 94 and 96 are rounded as indicated by the refer- allow the pusher dogs to tip forward to their disabled positions.

To control the disposition of the pusher dogs, a series of camming or indexing assemblies 110 are provided and it is important to note that these assemblies are fixed relative to the motion of the carriage 18 and for this purpose may conveniently be mounted on the framework 16 as shown more clearly in FIG. 3. For this purpose, mounting plates 112 are provided in fixed relation to the framework 16 each of which mounts an anchrong clevis 114 for pivotally anchoring one end of a fluid operated actuating motor 116 by means of the pivot pin 118. Each motor includes a piston rod 120 carrying a clevis 122 pivotally linked to the indexing or camming member 124 by means of the pivot pin 126. A stand 128 is also mounted on the plate 112 and carries a cross shaft 130 to one end of which is secured the aforementioned camming member 124 and the opposite end of which carries a lever element 132 to which the piston rod clevis 122 is joined by link pin 126 previously described. Thus, actuation of the motor 116 serves to operate the cam member 124 between its two positions indicated in FIGS. 7a and 7b.

Each cam member 124 is provided with a flat cam face 140 below the cross shaft 130 and a notch 142 above the cross shaft 130, there being a continuation 144 of the cam face 140 above the notch 142 as can be seen clearly in FIGS. 7a and 7b. One leg of each pusher dog carries a pair of laterally projecting pins 146 and 148 which as can be seen in FIG. 7a are adapted to be received respectively in the notch 142 and engaged by the cam face 140 when the cam member 124 is in that position which establishes the operative disposition of the associated pusher dog. On the other hand, when the motor 116 is actuated to withdraw its piston rod 120 as shown in FIG. 7b, the pins 146 and 148 are adapted to be engaged respectively by the cam face 144 and 140. As will hereinafter appear, the pusher dogs engage the camming members 124 only at the end of the return stroke of the carriage and the motors 116 normally are disposed by this time in the proper condition for orienting the members 124 to establish the proper indexed position of the various pusher dogs in preparation for the next working stroke. The notch 142 is provided so as to prevent a dog from being moved from its operative to its disabled positions once the parts are engaged, as will be clear from FIG. 7a.

It will be appreciated that the carriage 18 and its pusher dogs are shown in FIG. 1 at the end of the working stroke of the carriage. For clarity, only one pusher dog 24 is shown, in dashed lines, at its position at the end of the return stroke preparatory to the beginning of the next working stroke. It will be clear, however, that each pusher dog lies somewhat in advance of its associated article position at the end of the return stroke.

Figure 4:
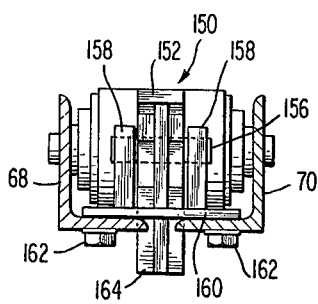
FIG. 4 is a transverse section through one arm of the article supporting portion of the conveyor and illustrating one of the article sensing devices.
Figure 5:
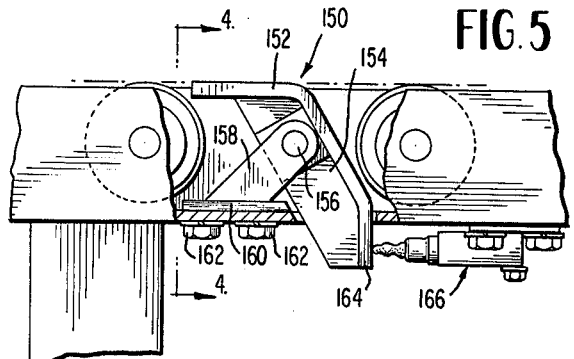
FIG. 5 is a side elevational view with portions broken away showing further details of an article sensing device.

Corresponding to each of the article positions which are identified in FIG. 1 by the dashed line showing of articles, an article sensing means is provided, one of which is indicated generally by the reference character 150 in FIGS. 2, 4 and 5. The article sensing means may be disposed in place of one of the rollers 72 or 74 and comprises a normally horizontal shoe portion 152 of its main body 154, which main body is pivotally connected as by a pin 156 to an upstanding ear 158 anchored as by means of a base plate 160 and suitable fastener 162 to the angle members 68 and 70 previously described. The lower end 164 of the body 154 projects below the level of the angle members 68 and 70 and is adapted to actuate a microswitch 166 which forms part of the control system as will now be described.

Figure 8:
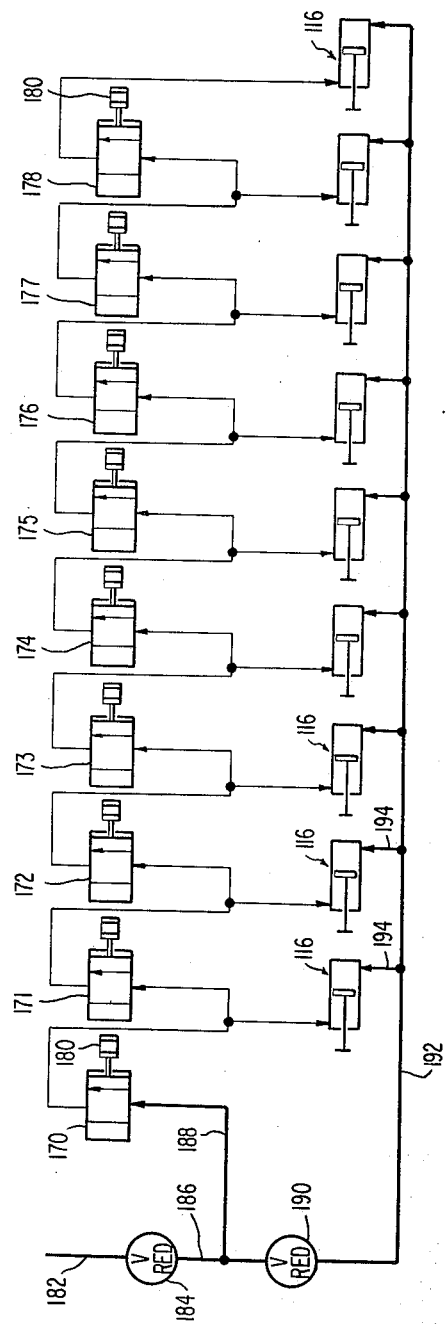
FIG. 8 is a diagrammatic view illustrating the control system for the accumulating transfer conveyor.

The control system is shown in FIG. 8 and consists of a series of valves 170–178 for controlling respective ones of the actuator motors 116. Each valve has a solenoid actuator 180 associated therewith which is controlled by a corresponding microswitch 166 actuated by one of the article sensing means 150. To correlate FIGS. 1 and 8, the article sensing means which controls the solenoid actuator for the valve 170 is located at the position of the article 52 whereas the article sensing means associated with the actuator 180 for the valve 178 is located at the article position B in FIG. 1, there being no requirement for an article sensing means at the position of the article 50 in FIG. 1 insofar as the present system is concerned. The valves, on the other hand, control the actuating motors 116 for the pusher dog of the next preceding article position. Thus, the presence of an article at the position 52 in FIG. 1 will control the pusher dog 40 through its actuating motor 116 when the pusher dog returns at the end of its return stroke to disable the pusher dog 40, and so on, the valve 178 ultimately controlling the disposition of the pusher dog 24.

Figure 9:
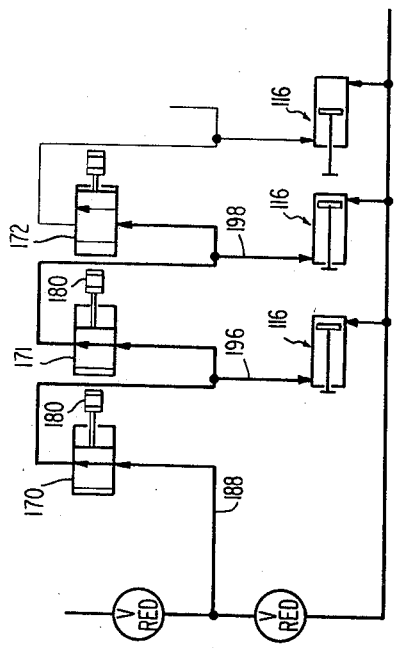
FIG. 9 is a view showing a portion of FIG. 8 but illustrating certain operative relationships thereof.

The actuating motors 116 are controlled by differential fluid pressure and for this purpose they are connected to a suitable fluid pressure source by means of the conduit 182 (FIG. 8) which passes through a reducing valve 184 to establish in the line 186 a predetermined high pressure which branches off at 188 to the first valve 170 and to a second pressure reducing valve 190 to establish a low pressure in the common low pressure line 192 which is branched as at 194 to all of the actuators 116. Consequently, since in the position of the valves in FIG. 8 all high pressure connections to the actuators 116 are blocked, the actuators 116 will all be urged to the left in FIG. 8 to establish their cam members 124 in the position shown in FIG. 7a so that when the carriage 18 reaches the end of its return stroke, all of the pusher dogs will be indexed to their operative positions. If, however, as is shown in FIG. 9, the article 52 of FIG. 1 has not been removed from the terminal or discharge position, the signal from the corresponding article sensing means 150 will actuate the valve 170 to the position shown which allows the high pressure line 188 to connect through to the inlet line 196 of the actuator motor 116 controlling the camming member for the pusher dog 40 so that this particular actuating motor 116 will assume the position of FIG. 7b so that the pusher dog 40 is disposed in its disabled position. If an article is also present at the position C shown in FIG. 1, the next valve 171 will also be actuated by means of its associated article sensing means 150 at the position C to open this valve and allow the high pressure fluid to continue on to the inlet 198 of the next actuator motor 116 whereupon the pusher dog 38 will also be disposed in disabled position when it reaches the end of its return stroke and engages the camming member 124. If, now, there is no article at the position D of FIG. 1, the next valve 172 will not be actuated as is shown in FIG. 9 and further travel of the high pressure fluid will be blocked at this point so that the next motor 116 corresponding to the pusher dog 36 will remain in its FIG. 7a position and all preceding pusher dog camming members will likewise remain in their vertical positions so that all of the remaining preceding pusher dogs will be effective to advance their respective articles to the next succeeding article position.

The differential fluid pressure system for control of the pusher dog indexing mechanism is particularly well suited to the concept of moving the pusher dogs out of contact with the indexing mechanism during the working stroke. In this connection, it will be appreciated that until the end portion becomes blocked, all of the pusher dogs will be disposed in operative positions, this being accomplished in the present system by the simple expedient of blocking any effect by the high pressure fluid so that the direct connection of the low pressure fluid line to the indexing motors is effective to maintain all of the indexing mechanisms in position to allow the pusher dogs to remain in their operative positions. When the end portion is blocked, the high pressure line simply is valved sequentially to the individual indexing motors until an empty position on the conveyor line is encountered, thus actuating the indexing mechanisms so affected. Only the sequential valve relation is required and no additional or complex system of valving or control is required inasmuch as the pusher dogs are moved away from their indexing mechanisms where the working stroke is commenced.

What is claimed is:

1. An accumulating transfer conveyor of the type comprising a conveyor frame adapted to support articles at a plurality of positions therealong, transfer means associated with said positions for advancing articles from a first position to successive next adjacent positions, control means including article sensing means associated with said positions and operable in response to the presence of an article blocking one of said positions to disable the transfer means associated with the immediately preceding position, the transfer means associated with each of the remaining preceding positions being operable to advance articles to successive next adjacent positions during such disablement so long as there is a vacant position preceding the blocked position, the improvement comprising:

carriage means for moving said said transfer means back and forth along a path defining the working stroke of the conveyor, each transfer means being mounted on said carriage means for movement between an operative position and a disabled position, and said control means including cam means mounted on said conveyor frame for indexing said transfer means during return movement thereof in the working stroke of the conveyor, each cam means being controlled by the article sensing means at the next succeeeding position.

2. An accumulating transfer conveyor as defined in claim 1 wherein each cam means includes an actuating motor therefor, each actuating motor comprising a cylinder and a piston, a source of low pressure fluid continuously connected to one end of each cylinder normally to urge the associated piston toward the opposite end, said article sensing means including valves for connecting a source of high pressure fluid to the opposite ends of said cylinders, said valves serially controlling admission of high pressure fluid to said cylinders.

3. An accumulating transfer conveyor comprising, in combination, a conveyor frame having a supporting portion adapted to support articles for movement along a predetermined path thereon, carriage means mounted for reciprocation back and forth along a path offset from the path along which the articles may move, a series of longitudinally spaced pusher dogs movably mounted on said carriage means for movement between operative positions in which they may engage articles on said supporting portion and disabled positions in which they may clear articles on said supporting portion, means for cyclically reciprocating said carriage means back and forth through working and return strokes which are greater than the spacing between said pusher dogs, whereby articles are conveyed in step-by-step fashion from an initial position through a series of successive article positions on said supporting portion, cam means for each of said pusher dogs each positioned to be engaged by its associated pusher dog at the end of the return stroke of said carriage means whereby each pusher dog moves away from and remains out of engagement with said cam means during the working stroke of the carriage means, each cam means being movable between a first position, which cams its pusher dog to the operative position thereof, and a second position which cams its pusher dog to the disabled position thereof, and control means including article sensing means associated with said article positions and operable in response to the presence of an article blocking one of said article positions to move the cam means of the pusher dog associated with the immediately preceding article position to said second position thereof, the pusher dogs associated with each of the remaining preceding positions being operable to advance articles to successive next adjacent positions during such disablement so long as there is a vacant position preceding the blocked position.

4. An accumulating transfer conveyor as defined in claim 3 wherein each cam means includes an actuating motor therefor, each actuating motor comprising a cylinder and a piston, a source of low pressure fluid continuously connected to one end of each cylinder normally to urge the associated piston toward the opposite end, said article sensing means including valves for connecting a source of high pressure fluid to the opposite ends of said cylinders, said valves serially controlling admission of high pressure fluid to said cylinders.

References Cited

UNITED STATES PATENTS

| 3,322,259 | 5/1967 | Milazzo | 198—219 |
| 3,369,650 | 2/1968 | Caretto | 198—219 |

RICHARD E. AEGERTER, Primary Examiner

U.S. Cl. X.R.

198—34